Patented Jan. 31, 1939

2,145,648

UNITED STATES PATENT OFFICE 2,145,648

MANUFACTURE OF MASTIC TILE

Charles E. Fawkes, Chicago, Ill., and George P. Heppes, Upper Montclair, N. J., assignors to The Tile-Tex Company, Chicago Heights, Ill., a corporation of Illinois No Drawing. Application January 21, 1935, Serial No. 2,799

2 Claims. (Cl. 106—7)

This invention relates to the manufacture of composition tile most commonly known as "mastic tile".

More specifically it relates to a new and improved binder to be used in such tile in place of the pitches, asphalts, resins, et cetera, which have been used in the past in the compounding of such tiles. The use of the improved binder results in mastic tile having new and improved properties which have long been sought in this art, as will be fully disclosed in the succeeding specification.

To briefly review the state of the prior art in this field, mastic tile was first evolved as an adaptation in the compositions which had previously been used in paving highways and streets with so-called "asphalt macadam". In mastic floor tile, or asphalt tile, the rock and/or sand and/or gravel were replaced by fibrous fillers, such as asbestos, mica, and mineral wool; and furthermore, colors, such as iron oxide, lead chromate, Prussian blue, et cetera, were added to give color to the composition and conceal or change the unattractive hue of the asphaltic binder or stickative. Many variations of asphalt have been used, including gilsonite, Trinidad asphalt, blown petroleum asphalt, et cetera.

In some of the earlier attempts at making satisfactory mastic flooring, asphaltic material dissolved in suitable solvents was mixed with asbestos or other fibrous materials to make a workable paste and this was troweled on in successive coats. This procedure was found to be dangerous on account of the volatile explosive gases which were liberated during the drying period and to be inconvenient on account of the very slow technique involved in applying the materials due to waiting for successive coats to dry.

The preceding developments which sought to produce mastic flooring at ordinary temperatures was followed by the use of so-called "hot" processes. In place of using a solvent to distribute the asphaltic binders upon the mineral fillers and colors, these constituents were masticated upon heated rolls or in heated internal mixers or the like to cause the binders to melt and thus saturate the fillers and colors. A typical formula for such a mix to give a black tile might be:

Parts by weight

Gilsonite (280° M. P.) _____ 28
Paraffin oil _____ 13
Asbestos fiber _____ 80
Carbon black _____ 2

Constituents of the above general character are thrown upon heated masticating rolls and milled until the asbestos and color pigments are thoroughly incorporated in the asphaltic binder. When this operation is judged complete, the mass is stripped from the masticating rolls, passed through heated forming rolls which roll it into a thin, smooth sheet, after which, while still hot, the new smooth piece is cut into tile of the proper size and shape and allowed to cool and become solid.

From a study of such tiles, it becomes apparent that they have the following practical deficiencies. If they are made hard enough for use as flooring in an unusually warm environment, they are too brittle for a cold environment, and vice versa. The high tinctorial strength of the gilsonite (or its equivalent) makes the consumption of costly color pigments very great and the production of pale or pastel shades, such as orchid, jade, et cetera, practically impossible. Tile containing hydrocarbon material is sensitive to gasoline, greases, oils, et cetera, which practically excludes their use in garages, filling stations, machine shops, et cetera.

In recent years, the mastic tile industry has investigated and adopted certain improved binders, principally with the object of obtaining light pastel shades, and likewise of reducing the amount of color pigment necessary to get a given color hue. This work has been done principally upon the class of resins known as the cumarone and indene resins. These resins are made by condensing cumarone and the hydrocarbons, cumene, and indene and homologs, (alone or mixed) with inorganic acid by well known methods. These resins are light in color compared to those containing asphaltic materials and have a suitable melting point, but they are friable and brittle and not particularly strong. To overcome their friability and brittleness, certain modifying agents have been used to impart distensibility and ductility to the cumarone resins. These modifying agents are usually pitches, such as stearine pitch, corn oil foots pitch, fish oil pitch, cottonseed pitch, and the like. The method of mixing such binders is substantially the same as that used with asphaltic binders, namely, that of rolling or mixing with the fillers at a temperature such as to melt the binders to a flowable condition.

The formula for such a tile of a so-called rose color might be:

Parts by weight

Cumarone resin (180° M. P.) _____ 24
Rosin _____ 2
Fish oil still pitch _____ 10
Asbestos fiber _____ 82
High strength lithopone _____ 13
Red iron oxide _____ 3

Tiles of the above character, although using much less color and giving reasonably light shades, still have certain disadvantages. Their resistance to gasoline, grease, or oil is only slightly improved over that of asphaltic-bound tiles and in addition, the fact that the pitches used in their composition are largely fatty acid residues makes them still sensitive to soaps and detergents. Furthermore, since such pitches are unsaturated and contain oxidizable, unsaturated linkages, gradual unequal oxidation of the pitch is likely to cause such tiles to warp and shrink after they are laid in place upon the floor.

Much work has been done in an effort to overcome the above recounted difficulties and disadvantages. In co-pending application Serial No. 3,290, filed January 24, 1935, there is indicated how the tendency to oxidize may be combated and in co-pending application Serial No. 2,798, filed January 21, 1935, we show how the action of soaps and detergents may be minimized. These methods are corrective of this type of constituents, however, and are not to be confused with the present invention, which overcomes these difficulties by avoiding them by the use of a totally different chemical entity as binder. In various attempts which have been made to overcome such weaknesses tiles have been produced which have been factory waxed and cements have been developed to try to overcome the warping and shrinking of the tile. Various treatments have been carried out upon the pitches such as sulphur vulcanization, only to find that the color pigments in the tile are injured by the excess of sulphur over that required for vulcanization. Resins have been used instead of or as modifiers for the cumar, such as oil reactive phenolic resins, for instance, which are known to protect drying oils form detergents in "soap-proof" varnishes. Some manufacturers have even produced tiles varnished with phenolic varnishes upon the top wearing surface.

In one specific embodiment the present invention comprises the use of cellulose ethers alone or with resins or other modifiers as binders in mastic tile compositions.

We have found that in contrast to nitrocellulose or cellulose acetate or other esters of cellulose, the use of ethers of cellulose requires practically no change in the equipment or technique available in the mastic flooring factory.

The methods of preparing ethers of cellulose are fairly well known in the art and since processes for their manufacture constitute no feature of the present invention only brief mention will be made of the methods utilizable for their production. In general, they are manufactured by treating alkali celluloses with alkyl sulfates or chlorides with the optional use of condensing or accelerating agents. For example, the ethyl ether of cellulose may be made by treating an alkali cellulose with diethyl sulfate. Other methods have been proposed involving the use of metallic hydroxides and ethyl chloride. The reactions of such compounds as benzyl sulfate, amyl chloride, et cetera, to produce the corresponding cellulose ethers are strictly analogous, although the details of procedure in commercial operation vary widely.

To illustrate to those skilled in this art, the many variations and modifications which may be adopted in using this type of binder, we give below some preferred formulae for tiles bound with cellulose ethers alone and with modifying agents.

A very tough, strong, white tile may be made using only the ethers of cellulose as binders. For example,

| | Parts by weight |
|---|---|
| Benzyl cellulose | 40 |
| Asbestos fiber | 60 |
| Titanium oxide | 5 |
| Triphenyl phosphate | 2 | or, using ethyl cellulose or amyl cellulose in the same proportion, similarly strong tile results.

We have found that these tiles can be made increasingly flexible and distensible by the incorporation of increased amounts of plasticizers, thus:

| | Type I | Type II | Type III |
|---|---|---|---|
| Benzyl or ethyl cellulose | 19 | 19 | 19 |
| Asbestos fiber | 32 | 32 | 32 |
| Titanium oxide | 4 | 4 | 4 |
| Lead chromate | 1 | 1 | 1 |
| Iron blue | ½ | ½ | ½ |
| Dibutyl phthalate | 3 | | |
| Triphenyl phosphate | | 3 | |
| Tricresyl phosphate | | | 3 |

We have found that the common cellulose esters, such as nitrocellulose or cellulose acetate, do not maintain compatibility with the cumar resins in tile. This incompatibility results in poor strength and rapid loss in strength after milling and tile formation. It has been found as a feature of the present invention that this incompatibility can be overcome to a large extent by the use of cellulose ethers as modifying agents, thus:

| | Type IV | Type V | Type VI |
|---|---|---|---|
| Cumar resin T5 | 19 | 12½ | 12½ |
| Ethyl cellulose | 2 | 3¼ | 3 |
| 15-20 sec. viscosity nitrocellulose | 2¾ | 4½ | |
| Dibutyl phthalate | 2 | 3 | 2 |
| Asbestos | 32 | 32 | 32 |
| Lead chromate | 1 | 1 | 1 |
| Iron blue | ½ | ½ | ½ |
| Titanium oxide | 4 | 4 | 4 |
| Scrap film | | | 4½ |

With cumar resin alone, the toughening effect of the cellulose ether is most remarkable. Thus, the following tiles have been prepared and all have a strength and toughness exceeding greatly the strongest and toughest tiles which it is possible to make using pitches or oils as modifiers of the cumar resins.

| | Type VII | Type VIII | Type IX | Type X | Type XI |
|---|---|---|---|---|---|
| Cumar T5 | 12½ | 12½ | 12½ | 17 | 19 |
| Ethyl cellulose | | 6½ | 6½ | 2 | 4 |
| Benzyl cellulose | 6½ | | | | |
| Asbestos | 32 | 32 | 32 | 32 | 32 |
| Dibutyl phthalate | 3 | | | 1 | 2 |
| Tricenyl phosphate | | | 3 | | |
| Triphenyl phosphate | | 3 | | | |
| Lead chromate | 1 | 1 | 1 | 1 | 1 |
| Iron blue | ½ | ½ | ½ | ½ | ½ |
| Titanium oxide | 4 | 4 | 4 | 4 | 4 |

Furthermore, we find that very small amounts of either ethyl or benzyl cellulose added to tiles which are largely bound with para cumarone resins and pitches which do not blend well, or when it is desired to use an additional resin which will not blend well with pitch or with para cumarone resins and pitch, aids the blending of the incompatable constituents to give a homogeneous binder. To illustrate, we find that the following tile retains its original molded strength over long periods, due to the added cellulose ether causing the pitch and resin constituents to be in apparent stability:

| | Parts |
|---|---|
| Paracumarone resin | 29 |
| Ethyl cellulose | 1 |
| Stearine pitch M. P. 110° F | 20 |
| Asbestos fiber | 80 |
| Cryptone | 15 |
| Lead chromate | 2 |

In the practice of our invention, the constituents of tile blends are thrown upon heated masticating rolls and milled until the fillers and colors are judged to be sufficiently incorporated into the cellulose ether binder alone or with modifying agent or agents. In fact, the procedure is identical to that already outlined for asphaltic or cumar pitch tiles. The mix is then stripped from the rolls, passed through forming rolls and cut to size and shape.

The tiles resulting from the practice of our invention have new and useful properties. For example, tile No. 1 above is unaffected by gasoline, petroleum grease, butter fat, et cetera. The tiles are generally very resistant to water, soaps and detergents. Furthermore, they exhibit no tendency to shrink or curl when made according to the above formulae, since there is no molecular unsaturation in these cellulose ethers, and the ether linkage is acknowledged to be a very stable one.

One of the most valuable advantages of our tile is its plastic flow. When an ordinary mastic tile is laid over a hump or seam in a floor, it often fails to assume the contour of the surface beneath and cracks quickly in use from the traffic over it. Our cellulose ether tile, on the other hand, is tough and resilient and will gradually yield and deform from the traffic upon it and finally assume the contour of the surface against which it is laid.

It will be seen from the above that we have incorporated relatively small amounts of these ethers in the fabrication of tile bound largely with cumarone-indene resins and pitches to produce a desirable effect on the properties of these tiles. Thus, the transverse strength of the structure is increased, resistance to cold flow is improved, the color is lightened, resistance to embrittlement at low temperatures is better and they are not affected by soaps and detergents, et cetera.

The resistance of this type of cellulose ether bound tile to marring and abrasion is so great that thin sections may be rolled out and laminated with heat, heat and pressure, or adhesives to base structures of lower quality and cost to give composite laminated tiles. The top wearing surfaces of such tiles possess the color and beauty of the light pastel shades obtainable when the cellulose ethers are pasted integrally to asphalt tile, or roofing paper, or pressed wood, such as Masonite, et cetera.

The foregoing specification and examples have described the general character of the invention and illustrated the general process and the type of products obtainable by its use but neither section is to be considered as imposing exactly corresponding limitations upon its generally broad scope.

We claim as our invention:

1. A heat molded composition tile comprising an inert fibrous filler bound with a paracoumarone resin and nitrocellulose rendered compatible with each other by a minor quantity of an aliphatic ether of cellulose.

2. A heat molded composition tile comprising an inert fibrous filler bound with a paracoumarone resin and celluloid rendered compatible with each other by a minor quantity of an aliphatic ether of cellulose.

CHARLES E. FAWKES.
GEORGE P. HEPPES.